May 15, 1962  J. STALEY  3,035,156
WELDING WITH OSCILLATABLE WELDING HEAD
Filed June 4, 1958  3 Sheets-Sheet 1
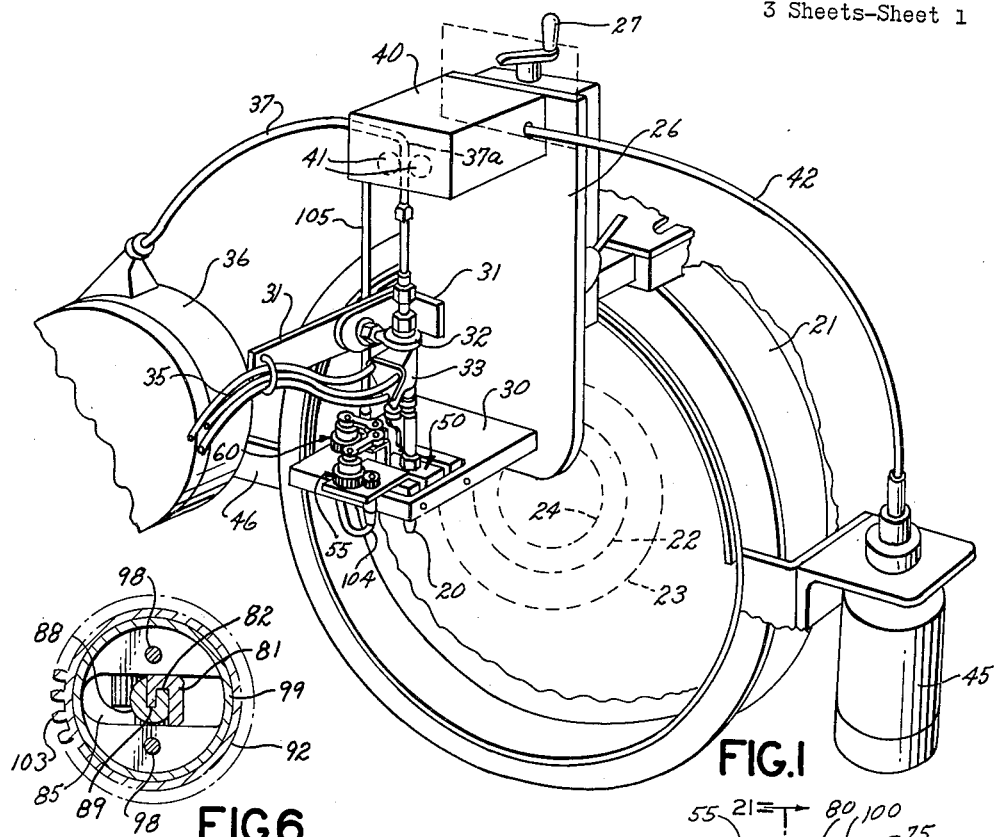
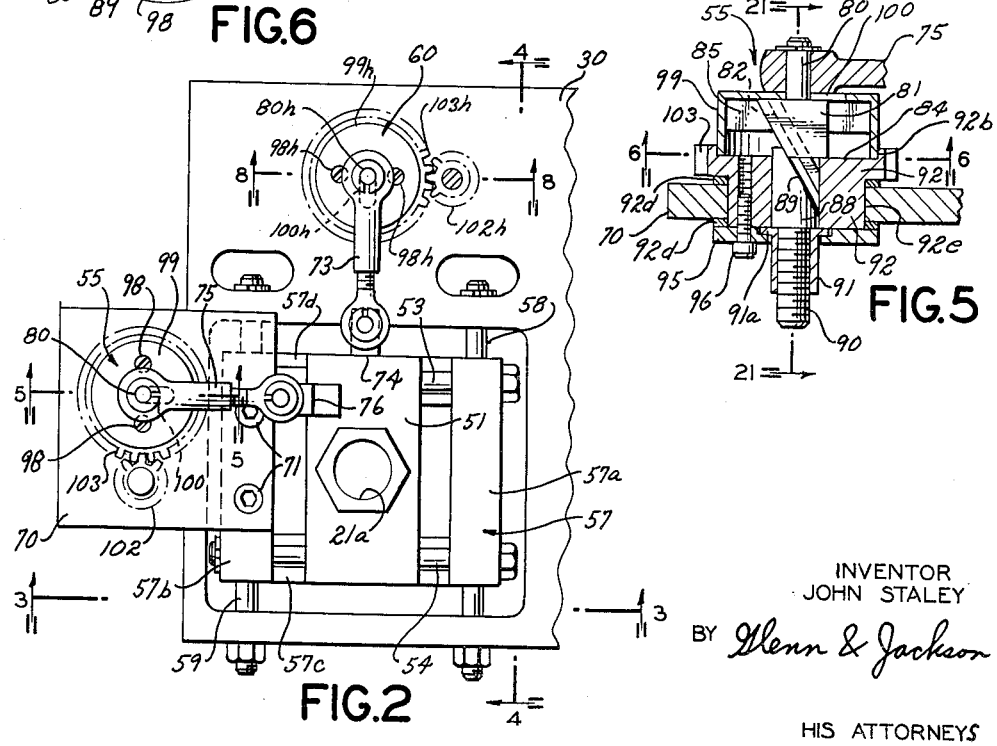
INVENTOR
JOHN STALEY
BY Glenn & Jackson
HIS ATTORNEYS May 15, 1962 J. STALEY 3,035,156
WELDING WITH OSCILLATABLE WELDING HEAD
Filed June 4, 1958 3 Sheets-Sheet 2
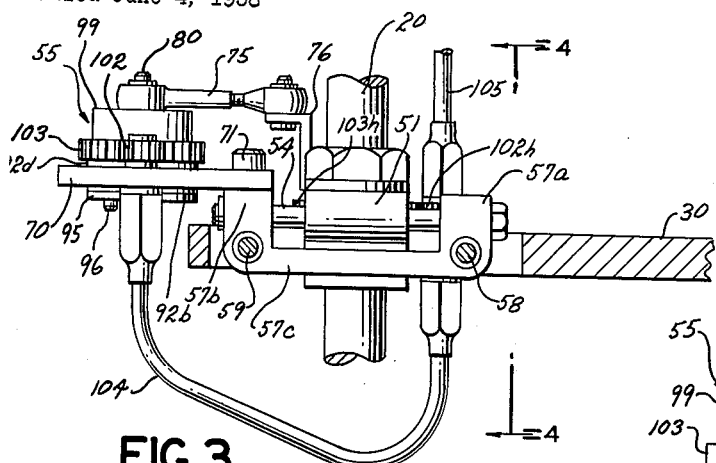
FIG. 3
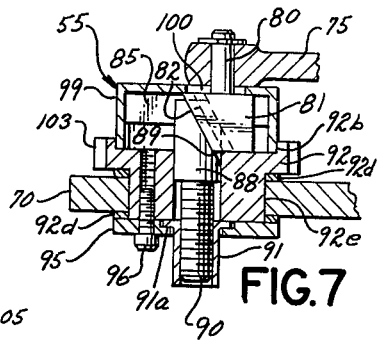
FIG. 7
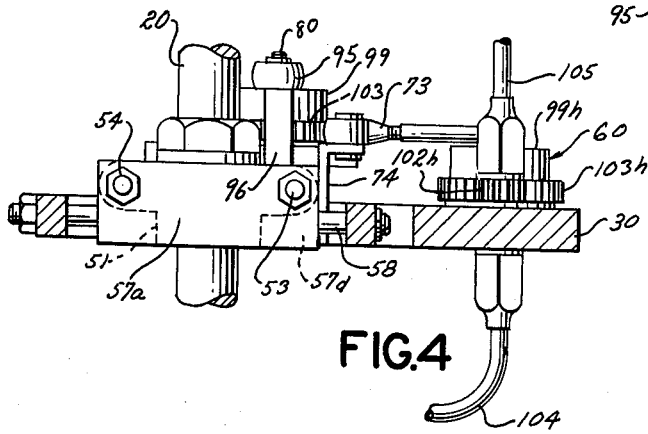
FIG. 4
FIG. 10
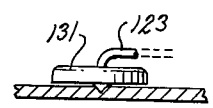
FIG. 9
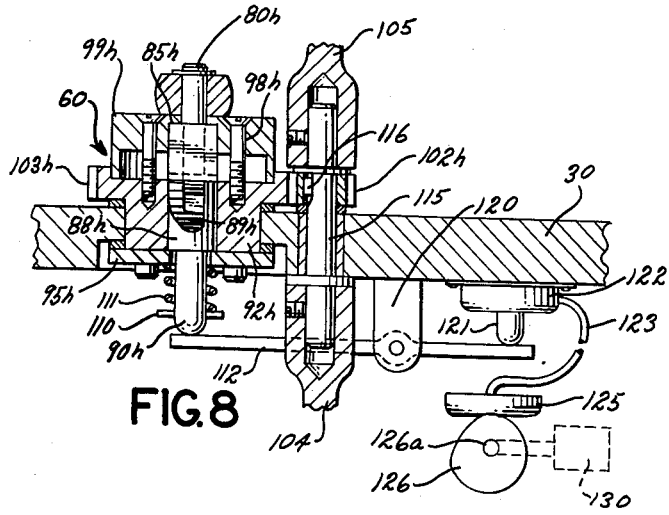
FIG. 8
INVENTOR
JOHN STALEY
BY Glenn & Jackson
HIS ATTORNEYS May 15, 1962  J. STALEY  3,035,156
WELDING WITH OSCILLATABLE WELDING HEAD
Filed June 4, 1958  3 Sheets-Sheet 3
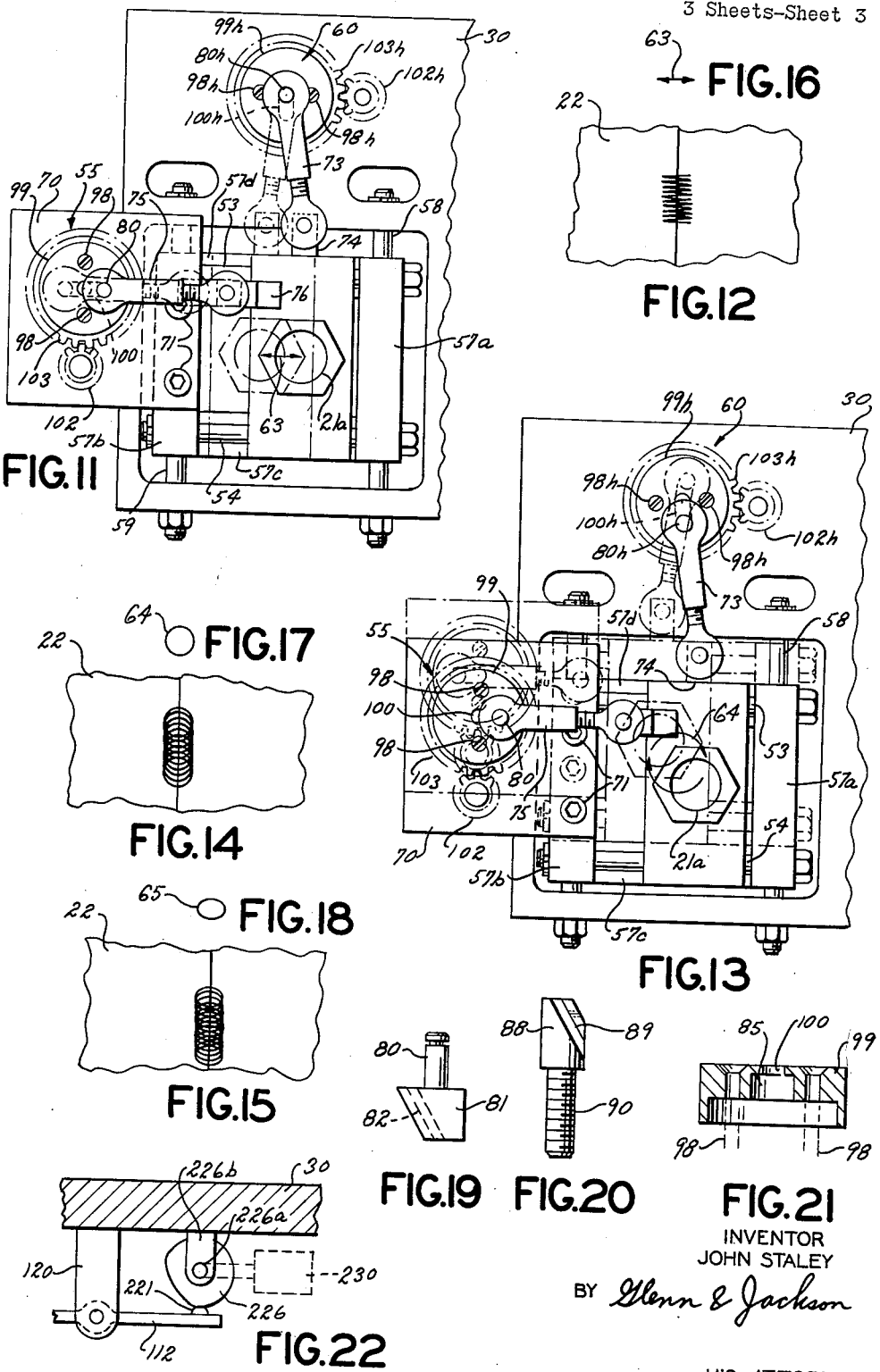
INVENTOR
JOHN STALEY
BY Glenn & Jackson
HIS ATTORNEYS

United States Patent Office 3,035,156
Patented May 15, 1962

3,035,156
WELDING WITH OSCILLATABLE
WELDING HEAD
John Staley, Louisville, Ky., assignor to Reynolds Metals
Company, Richmond, Va., a corporation of Delaware
Filed June 4, 1958, Ser. No. 739,847
23 Claims. (Cl. 219—125)

This invention relates to welding, particularly electric arc welding, in which the welding head is oscillated as it is moved along the place to be welded.

Apparatus has been provided heretofore which moves a welding head along the place, or seam, to be welded. It is desirable to oscillate the welding head as it moves along the place to be welded, to prevent burning of the joint, to promote the elimination of gas bubbles, to promote the elimination of porosity, to promote the elimination of segregation, and to produce other beneficial results by agitating the weld puddle. I have provided mechanical means to vary the character of the oscillations, and the amplitude of the oscillations to be produced during the travel of the welding head. Furthermore the means which I have provided may be actuated to vary the character of the oscillations while the welding head is progressing along the joint or the like. In addition, such variation may be made dependent on the character of the environment of the weld and in particular allow control of the penetration under various weld conditions, such as temperature, gauge of the metal, or composition of the metal, without materially affecting other welding variables. The means may also be used to vary the width of the weld zone.

Accordingly it is an object of this invention to provide apparatus for producing oscillations of the head as it is moved along the seam or the like, and to provide means for varying the character of such oscillations while such oscillations are being produced.

Another object of this invention is to provide means for selectively producing substantially no oscillation, linear oscillation, elliptical oscillation with the minor axis along the weld seam direction, elliptical oscillation with the major axis along the weld seam direction, or circular oscillation of the head.

Another object of this invention is to provide two eccentrics connected to the welding head at different angles, such eccentrics being rotated and being adjustable to produce no oscillation, and linear, elliptical, or circular oscillations as desired.

Another object of this invention is to provide an apparatus according to the foregoing object in which the eccentricity of the two eccentrics may be independently varied, and, if desired, one of the eccentrics being variable while such eccentric is operating.

Other objects of this invention are to provide apparatus for oscillating the welding head which varies the character of the oscillations while the oscillations are being produced, or while the head moves along the place being welded, and/or the variation being controlled by program control means, or by thermostatic means, or by manual means, all as desired.

Further objects of this invention will become apparent as the description proceeds with reference to the accompanying drawings in which:

FIG. 1 is a view in perspective of one type of apparatus to which this invention may be applied.

FIG. 2 is an enlarged plan view of the oscillating apparatus shown in FIG. 1.

FIG. 3 is a vertical cross section taken along the line 3—3 of FIG. 2.

FIG. 4 is a view transverse to FIG. 3, along the lines 4—4 of FIGS. 2 and 3.

FIG. 5 is an enlarged vertical cross section taken along the line 5—5 of FIG. 2.

FIG. 6 is a view taken along the line 6—6 of FIG. 5.

FIG. 7 is a view similar to FIG. 5, showing another stage of adjustment of the apparatus.

FIG. 8 is an enlarged vertical cross section along the line 8—8 of FIG. 2 and showing a program, manual or similar control for one of the eccentrics.

FIG. 9 shows a manual control, which may be substituted for the cam control of FIG. 8.

FIG. 10 is a thermostatic control which may be substituted for the cam control of FIG. 8.

FIG. 11 is a view similar to FIG. 2, with one of the eccentrics adjusted to its maximum eccentricity and with the other eccentric at zero eccentricity.

FIG. 12 is a view showing the path of travel of the welding head along the weld bead with the adjustment shown in FIG. 11.

FIG. 13 is a view similar to FIG. 11, with both eccentrics, adjusted to maximum eccentricity.

FIG. 14 shows the path produced by the welding head along the weld bead with the apparatus adjusted as in FIG. 13.

FIG. 15 is a view similar to FIG. 14, but showing the path of the welding head when one of the eccentrics is adjusted to intermediate eccentricity.

FIGS. 16, 17, and 18, show respectively the type of oscillations produced in FIGS. 12, 14, and 15 if the forward travel of the welding head is eliminated.

FIG. 19 is a side elevation of the eccentric pin carrying member shown in FIG. 5.

FIG. 20 is a side elevation of the vertically movable adjusting pin shown in FIG. 5.

FIG. 21 is a cross section of the inverted cup member taken along the line 21—21 of FIG. 5.

FIG. 22 shows another embodiment of the eccentricity adjustment.

FIG. 1 shows, by way of example, one of the many types of apparatus with which this invention may be used. This particular apparatus moves the welding head 20 circularly around the outside of the vertical circular joint between two relatively large pipes which may be in horizontal axial alignment. In this particular type of apparatus, a cylinder 21 is supported in coaxial relationship with the horizontal pipe 22, indicated in dotted line, or larger or smaller pipes 23 or 24, around which the apparatus is adapted to be adjustably positioned. The welding head 20 is adjustable radially with respect to the axis of the pipe 22, since the head is supported on a radially movable plate 26, carried by the cylinder 21, and which may be moved radially of the axis of the pipe by turning the handle 27. The plate 26 carries a platform 30 on which the welding head oscillating mechanism is mounted. The plate 26 also supports a bracket 31 which supports an oscillatable bearing 32 which supports the upper body 33 of the welding gun in axially fixed relationship. Suitable electric, inert gas, and water lines 35 are connected to the body 33 of the welding gun, in a manner well known in the welding art. An electrode wire reel housing 36 insulatably supports the reel of a welding electrode wire which is fed through the flexible insulating cable housing 37 into the gear box 40 which is also supported on the plate 26. The electrode wire 37a is actuated by the insulated rollers 41 which are driven by a suitable gearing construction, not shown, which is actuated by the flexible power cable 42 driven by the variable speed electric motor 45 which is carried by the drum 21. The reel housing 36 is also carried by the drum 21, by the bracket 46. The motor 45, and other parts of the apparatus, are controlled by a program timer switch, not shown, which actuates the various parts of the welding apparatus at the proper times to produce the desired weld completely around the joint between the two aligned pipes being welded together.

The environment of the bead being welded is continuously changing as the head 20 travels around the outer edge of the pipe joint. The environment changes because the temperature of the pipes varies as the weld proceeds. Also the joint being welded is in a vertical plane and the welding head 20 travels around the joint and is continuously directed toward the center of the joint in substantially a radial relationship with respect to the axis of the joint. Hence the "bottom" of the weld puddle is sometimes horizontal, sometimes vertical, sometimes slanting, and sometimes is moving horizontally, downwardly or upwardly, and under such conditions the weld puddle requires a changing character of oscillation to be satisfactory. The apparatus shown in FIG. 1 pertains to the welding of circular joints and the like, and is disclosed as an example of one welding apparatus wherein the enviroment of the welding operation changes, and to which my invention may be applied.

The platform 30, of FIG. 1, supports the oscillating apparatus, generally indicated by the numeral 50 which is shown on enlarged scale in FIG. 2 and other figs. In the following description, the words "horizontal" and "vertical" are generally used in connection with the apparatus in the position illustrated in FIG. 1, when such apparatus is in the "zero" position, it being understood that such apparatus rotates about the circular joint being welded, and hence the elements so rotated, which originally were "vertical" or "horizontal" in the zero position gradually become displaced from such positions, as is obvious. Similarly words such as "above," "below," "top" and "bottom" are generally used and applied to the apparatus in the position of FIG. 1.

In FIG. 2, a universally horizontally movable carriage, or plate, 51 supports the electrode head 20 in the opening 21a. The plate 51 can slide back and forth on the bars 53 and 54 under actuation of the eccentric construction 55. The bars 53 and 54, and the eccentric construction 55 are mounted on the U-shaped sliding carriage made up of members 57a, 57b, 57c, 53, 54 to be described. The U-shaped carriage, in turn, is slidably supported on the bars 58 and 59 which are fixedly mounted on the plate 30. The U-shaped carriage is oscillated back and forth on the bars 58 and 59 by means of the eccentric construction 60. Hence the welding head 20 placed in the opening 21a is oscillated, or not oscillated, depending on the adjustment of the eccentricity of the eccentrics 55 and 60 which exert their combined movements at right angle to each other in a manner to be more fully described. For example, if the eccentric 60 is adjusted to no eccentricity, and eccentric 55 is adjusted to maximum eccentricity, as shown in FIG. 11, then the electrode head 20 has a linear oscillation imparted thereto as indicated at 63, FIG. 11 or FIG. 16. If the eccentrics 60 and 55 are both adjusted to maximum eccentricity, then a circular oscillation is imparted to the electrode head 20, as indicated at 64 in FIGS. 13 and 17. If eccentric 55 is adjusted to maximum eccentricity, and eccentric 60 is adjusted to intermediate eccentricity an adjustment not illustrated, then the electrode head 20 will have an elliptical oscillation imparted thereto as indicated in FIG. 18, the ellipse being designated by the numeral 65.

The U-shaped carriage (see particularly FIG. 3) includes the two substantially rectangular sided bars 57a and 57b which merge into, or are attached to, the lower bars 57c and 57d. The bars 57a and 57b have holes or bearings for receiving the rods 58 and 59 in sliding relationship. The platform or plate 51 is a substantially rectangular sided plate having suitable holes or bearings through which the rods 54 and 53 pass in sliding relationship. The rods 53 and 54 are fixedly secured in bars 57a and 57b.

The eccentric construction 55 is mounted on a platform 70, which platform is supported on the bar 57b by means of the bolts 71, so the eccentric construction 55 oscillates in unison with the bar 57b of the U-shaped carriage. The eccentric construction 60 is mounted directly on the platform 30. It is connected by the connecting rod 73 with the bar 57d of the U-shaped carriage by means of the bracket 74, FIG. 4. Hence any oscillation of the connecting rod 73, by eccentric 60, imparts a reciprocating motion to the U-shaped carriage to slide back and forth on the rods 58 and 59. Oscillation of the connecting rod 75, by the eccentric 55, imparts back and forth movement to the plate 51, since the connecting rod 75 is connected by the bracket 76, FIG. 3, to the plate 51. The eccentric 60 has its axis relatively stationary with respect to the plate 30 whereas the eccentric 55 has its axis oscillating back and forth with respect to the plate or platform 30 when the eccentric 60 imparts any oscillation to the U-shaped carriage.

The eccentricity of eccentric 55 is manually variable, as is illustrated in FIGS. 5, 6, 7, and 19–21. In general, the eccentric pin 80, FIG. 19, is carried by a sliding base 81 which has the slanting groove 82 formed therein. The base 81 is slidable on the top surface 84 of the disc 92. The base 81 can slide horizontally in FIGS. 5 and 7 in the groove 85 to be described, but cannot move up or down. A vertically adjustable pin 88 has a slanting groove 89, which dovetails with the slanting groove 82 of the base 81, as shown in FIG. 6. A threaded extension 90 of the pin 88 is adjusted up or down by manually turning the sleeve 91 which is axially fixed but rotationally free with respect to the rotatable disc 92, FIG. 5. Manual turning of the sleeve 91 moves the pin 88 from its lowest position in FIG. 5, to a higher position in FIG. 7. Such vertical movement of the pin 88 causes a horizontal movement of the base 81 and pin 80 within the slots 85 and 100, by reason of the slanting groove construction 82 and 89. The pin 80 has no eccentricity in FIG. 5, and has an intermediate eccentricity in FIG. 7. Further movement upward of the pin 88 from the position shown in FIG. 7, will produce the maximum eccentricity when the base 81 moves to its farthest rightward position, in FIG. 7. The sleeve 91 has a flange 91a which is retained against the disc 92 by the flanged disc 95 which is secured to disc 92 by bolts 96 so that the sleeve 91 is axially fixed with respect to the disc 92, but is rotatably free. The pin 88 is axially free with respect to the disc 92, but is rotationally fixed because the base 81 is locked therewith and is rotationally fixed with respect to the disc 92 by the groove 85, as will become apparent. The screws 98 secure an inverted cup 99 which fits into the cylindrical shallow hole 92b in disc 92. The cup 99 has the grooves 85 and 100 to permit lateral movement of the base 81 and ecentric pin 80. The disc 92 is driven by the gear 102 which meshes with the teeth 103 of disc 92. Annular bearings 92d permit the disc 92 to rotate in opening 92e of platform 70.

The eccentric 60 (FIG. 8) has an internal construction substantially the same as eccentric 55, and where substantially identical elements operate in susbtantially the same manner, the same numerals are used as the reference characters of eccentric 55 with the suffix h added thereto. The threaded pin 90 of FIGS. 5 and 7 has been changed in FIG. 8 to a downwardly spring pressed unthreaded pin 90h having a disc 110 fixed thereto and a spring 111 interposed between the disc 110 and the disc 95h. Whenever the lever 112 presses upwardly on the pin 90h, such pin moves upwardly against the compression spring 111 and increases the eccentricity of the pin 80h in the same manner that the upward movement of the pin 88 in FIGS. 5 and 7 increases the eccentricity of the pin 80. The disc 92h has teeth 103h which mesh with the gear 102h. The flexible cable 104 is connected by the pin 115 to the cable 105, the pin 115 being keyed to the gear 102h at 116. Rotation of the cable 105 rotates the gears 102 and 102h as is obvious. Movement up and down of the pin 90h by the lever 112, adjusts the eccentricity of the pin 80h as is obvious from the description of the similar eccentric 55 shown in FIGS. 5, 6, 7, etc.

The adjustment difference between eccentric 55 and eccentric 60 is that eccentric 55 is adjusted by the manual turning of the sleeve 91 while such eccentric is stationary. Eccentric 60 is adjusted by the movement of the lever 112, which is fulcrumed at 120 to the platform 30. The lever 112 may be adjusted by the pin 121 which is moved up and down by the diaphragm 122 when power transmitting liquid is introduced or removed through the flexible tube 123. The flexible tube 123 is connected to a diaphragm 125 which is inwardly or outwardly moved by the cam 126 which may be contoured to produce the desired movement of the diaphragm 125 in turn to produce the desired eccentricity of the pin 80h. The cam 126 and its shaft 126a may be driven by a program device 130 which may be an individual motor with gear reduction therefor, or which may be suitable speed reducing gearing connected with the flexible cable 42 or any other program cable. The program device 130 may be interconnected with any other program control on the machine.

Alternatively, 130 may designate a reversible motor, with speed reducing gearing, the motor being manually controlled by a manually operable off, on, multiple position, and reversing switch located at any convenient place and connected to the motor 130 by flexible electric lines. In this manner the eccentric 60 may be manually adjusted to any desired eccentricity while it is in operation by manual operation of the last named switch.

If desired, the diaphragm 122 of FIG. 8 may be connected to the diaphragm 131 of FIG. 10 instead of to the diaphragm 125 of FIG. 8. The diaphragm 131 is a thermostatic diaphragm which is thermostatically responsive to any part of the pipe system within the environment of the seam which is being welded. Alternatively the diaphragm 131 may be carried by the platform 30 in proximity to or in sliding relationship in the neighborhood of the joint being welded or at a distance which may be representative of the temperature of the joint, but which may not have as high a temperature.

If desired, the diaphragm 122 of FIG. 8 may be connected to the diaphragm 130 of FIG. 9 instead of to the diaphragm 125. The diaphragm 140 may be manually adjusted to introduce or remove liquid into and from the diaphragm 122 by the turning of the manually actuated screw 141 threadedly carried by a relatively stationary member 142 attached to any portion of the apparatus where it will always be readily accessible for manual turning of the screw 141. The diaphragm 140 may be on a stationary part of the apparatus and may be connected by a sufficiently long flexible tube 123 to permit the diaphragm 125 to travel the required distance. By this manual adjustment, the operator may, from time to time, vary the eccentricity of the pin 80h, FIG. 8, as the welding head 20 moves along the joint which is being welded.

In FIG. 22, the cam 226 may bear more or less directly on the lever 112 of FIG. 8. The lever 112, fulcrum 120, and other parts not shown are otherwise similar to corresponding parts of FIG. 8, with the cam 126 and parts designated by 121, 122, 123, 125, 126a, and 130 omitted. The cam 226 engages the lever 112 more or less directly in any suitable manner, such as through the bead 221 on the lever 112. The cam 226, and its driving shaft 226a are supported from the platform 30 by two bearing members 226b which are attached to the under side of platform 30. A power transmission, such as flexible cable 223, connects the cam shaft 226a to a reversible motor 230, which has suitable speed reduction gearing, and which may be mounted, for example, on the platform 30, plate 26, cylinder 21, or any other rotating or stationary part. The motor 230 may be connected to a suitable on, off, multiple position, and reversing switch, by flexible electric lines if necessary, and the switch may be manually, program, or thermostatically controlled to adjust the eccentricity of eccentric 60 and/or 55 to obtain the results previously described. The shaft 226a may be driven by any other desired power means in lieu of motor 230, if desired.

Suitable antifriction bearings may be placed between the lever 112 and the pin 90h and pin 121 of FIG. 8, and the cam 226 of FIG. 22, as is obvious.

FIG. 12 shows the zigzag path which is traveled by the welding head 20 when the linear oscillation 63 of FIGS. 11 and 16 is combined with the forward movement of the head along the joint being welded. FIG. 14 shows the spiral path produced when the onward movement of the head is combined with the circular oscillation shown in FIGS. 13 and 17. FIG. 15 shows the modified spiral path produced when the ellipse 65 of FIG. 18 is combined with the onward movement of the head as it travels along the joint. It is to be noted that an ellipse with its major axis in the same direction as the joint being welded may be produced by making the eccentricity of eccentric 60 greater than the eccentricity of the eccentric 55.

In general, and by way of example, amplitudes of oscillation between $1/16$ inch to $3/8$ inch have been satisfactory for welding guns now being used to weld aluminum pipes of about eight inches more or less in diameter which are used for laying oil lines underground. Other amplitudes may also be used.

The linear oscillation shown in FIGURES 11, 12 and 16 produces the most penetration of the weld into the joint. An elliptical oscillation, with the major axis in the same direction as the joint being welded, produces the least penetration. The circular oscillation of FIGS. 13, 14 and 17 produces slightly more penetration than the last described elliptical oscillation. The elliptical oscillation of FIGS. 13, 15 and 18, with its major axis transverse to the line of travel, produces a penetration intermediate the circular oscillation of FIG. 17 and the linear oscillation of FIG. 16.

FIG. 1 shows the eccentric 60 located substantially in the plane of the circular joint being welded and the eccentric 55 located laterally from said plane. Under these conditions the eccentricity of the eccentric 55 may be adjusted manually before a welding operation by turning sleeve 91. The sidewise distance of the oscillations with respect to the central line of the weld bead will then remain the same during such welding operation until the rotation of eccentric 55 is stopped for further adjustment. In the meantime, the eccentricity of eccentric 60 may be adjusted during the welding operation by the rotation of cam 126 or screw 141 or thermostatically by diaphragm 131. In this manner the character of the composite oscillation may be changed during the welding operation from the linear oscillation of FIG. 16 to the substantially elliptical oscillation 65 of FIG. 18, to the substantially circular oscillation of FIG. 17 and to another elliptical oscillation with its major axis in the same plane with the central line of the weld bead.

If desired, the locations of the eccentrics 55 and 60 may be changed by having the eccentric 55 in the vertical plane of the joint and the eccentric 60 located laterally from such plane. This may be accomplished by rotating the location of the eccentric construction shown in FIG. 1 through an angle of 90° about a vertical axis either clockwise or counter-clockwise, as is obvious. Under these conditions the forward and backward distance of the oscillations along the central line of the weld bead will be determined by the manual adjustment of the now centrally located eccentric 60 and will remain the same during the ensuing welding operation and the sidewise distance of the oscillations may be adjusted by adjustment of the now laterally located eccentric 60. In this manner the width of the weld bead may be varied during the welding operation.

If desired, the eccentric 55 may also have the type of adjustment shown in FIGS. 8, 9, 10 and 22, so that both eccentrics 55 and 60 may have their eccentricity adjusted by any desired automatic or manual controls while such eccentrics are in operation. The diaphragms 121 of both eccentrics may be collapsed or expanded by simultaneously controlled diaphragms 125, 131 or 132 or by separately controlled diaphragms 121, 131, 132 which may be similarly or differently actuated and controlled. In this manner both the sidewise distance and the forward and backward distance of the oscillation with respect to the central line of the weld bead may be varied during the welding operation.

Conversely, the eccentric 60 may have the sleeve manual adjustment 91 shown in FIGS. 5, 6 and 7 so that both eccentrics 55 and 60 would have such sleeve manual adjustment. In ths manner both the sidewise distance and the forward and backward distance of the oscillations with respect to the central line of the weld bead may be varied before the start of the welding operation and will remain the same during the ensuing welding operation. This is a relatively inexpensive construction for use where a change of the character of the oscillations is desired between welding operations but no change is necessary during the welding operations. Such arrangement may be used when welding a plurality of horizontal linear seams, some of which require different types of oscillations from those required by other seams.

Without the means herein disclosed, the welding of a circular joint in a vertical plane would produce relatively small penetration during the downward travel of the electrode head and relatively deep penetration during the upward travel of the head. The curvature of the cam 126 may be constructed to offset this varying penetration and produce a uniform penetration by causing the oscillations of the welding head to promote a greater penetration of the downward travel of the head and to promote a lesser penetration on the upward travel of the head.

The invention has application to many other types of welding in addition to that shown in FIG. 1, such, for example, as the welding of linear joints, irregular joints, slanting joints, etc., or the welding of places where there is no pronounced seam. Also, the invention is applicable to various types of electric welding as well as gas welding. Throughout this descritpion and the appended claims, it is to be understood that the statements calling for the weld-head to move along the seam to be welded also encompasses the situation where the seam to be welded moves past the welding head, it being the movement relative to one another that is important.

Metal plungers and metal cylinders may be substituted for the diaphragms 122, 125, 131 and 140 and the usual flexible metal wire and tubular casing may be substituted for the flexible pipe 123 to transmit the impulse between said metal plungers and cylinders, as is obvious. The plunger and cylinder substituted for the diaphragm 131 may include a thermostatic element, as is well known.

While the embodiment now preferred has been disclosed as required by the statutes, other forms or embodiments may be used, all coming within the scope of the claims which follow.

I claim:

1. In combination: a welding head; means for producing relative movement of said head with respect to a seam to be welded; oscillating means selectively to produce linear and orbital oscillations of said head during said relative movement; and means to vary the character of said oscillations between linear and orbital oscillations while said oscillations are being produced.

2. In combination: a welding head; means for producing relative movement of said head with respect to a place to be welded; a source of power; and means selectively to produce substantially no oscillation, linear oscillation, elliptical oscillation, and circular oscillation of said head from said source of power, while said head is being oscillated.

3. In combination: a welding head; means for producing relative movement of said head with respect to a place to be welded; two eccentrics connected to said head at different angles to each other to oscillate said head; means to rotate said eccentrics during said relative movement; and means to vary the eccentricity of one of said eccentrics between no eccentricity and a selected eccentricity selectively to produce linear and orbital oscillations of said head.

4. A combination according to claim 3 in which means are provided to vary the eccentricity of both of said eccentrics.

5. In combination: a welding head; means for producing relative movement of said head with respect to a place to be welded; two eccentrics connected to said head at different angles to each other to oscillate said head; means to rotate said eccentrics during said relative movement; and means to vary the eccentricity of one of said eccentrics between no eccentricity and a selected eccentricity while said last named eccentric is operating.

6. In combination: a welding head; means for producing relative movement of said head with respect to a place to be welded; means to produce lateral oscillations of said head in directions at an angle to each other; and means operable during said oscillations to vary the character of one of said oscillations to change selectively between linear and orbital combined oscillations of said head.

7. A combination according to claim 6 in which the character of said oscillations may be varied during said relative movement.

8. A combination according to claim 6 in which program means are provided to control said last named means.

9. A combination according to claim 6 in which thermostatic means are provided to control said last named means in response to thermal conditions adjacent said place to be welded.

10. A combination according to claim 6 in which manual means are provided to control said last named means.

11. In combination: a welding head; a carriage supporting said head and universally movable in a plane; means for producing relative movement of said head and carriage relatively to a place to be welded; two eccentrics connected to said carriage at different angles to said carriage; means to rotate said eccentrics during said relative movement; and means to vary the eccentricity of one of said eccentrics between no eccentricity and a selected eccentricity selectively to produce linear and orbital oscillations of said head.

12. A combination according to claim 11 in which means are provided to vary the eccentricity of both of said eccentrics.

13. A combination according to claim 11 in which means are provided to vary the eccentricity of one of said eccentrics while said last named eccentric is operating.

14. In combination: a welding head; means for maintaining said head substantially radially directed at and moving said head along a circular seam to be welded, said seam lying in a plane inclined to a horizontal plane; oscillating means to produce oscillations of said head as it is moving around said seam; and means to vary the character of said oscillations while said head moves around said seam.

15. In combination: a welding head; a carriage universally movable in a plane and supporting said head; two eccentrics connected to said carriage at different angles to said carriage to oscillate said carriage; means to rotate said carriage and said head around a circular joint to be welded with said head maintained generally directed toward the center of said joint; and means to rotate said eccentrics while said head is moving around said joint.

16. A combination according to claim 15 in which means are provided to vary the eccentricity of one of said eccentrics.

17. In combination, a welding head, and means operatively interconnected to said head to produce orbital oscillations of said head, said last-named means also being adapted to produce linear oscillations of said head.

18. In combination, a welding head, means operatively interconnected to said head to produce orbital oscillations of said head, said last-named means also being adapted to produce linear oscillations of said head, and means to selectively vary the character of said oscillations between said linear and orbital oscillations of said head.

19. In combination, a welding means, and means operatively interconnected to said welding means to produce elliptical oscillations of said welding means, said first-named elliptical oscillations having the major axes thereof extending in one direction, said last-named means being adapted to vary the character of said elliptical oscillations so that said varied elliptical oscillations have the major axes thereof extending transverse to said one direction.

20. In combination, a welding means, and means operatively interconnected to said welding means to produce orbital oscillations of said welding means, said last-named means also being adapted to produce linear oscillations of said welding means.

21. In combination, a welding head, means operatively interconnected to said head to produce elliptical oscillations of said head, and means to vary the character of said elliptical oscillations of said head.

22. In combination, a welding head, means operatively interconnected to said head to produce elliptical oscillations of said head, and means to vary the character of said elliptical oscillations of said head while said elliptical oscillations are being produced.

23. In combination, a welding means, and means operatively interconnected to said welding means to produce circular oscillations of said welding means, said last-named means also being adjustable to produce elliptical oscillations of said welding means.

References Cited in the file of this patent

UNITED STATES PATENTS

| | | |
|---|---|---|
| 1,792,243 | Richter | Feb. 10, 1931 |
| 1,933,340 | Raymond | Oct. 31, 1933 |
| 2,776,363 | Payne | Jan. 1, 1957 |
| 2,817,748 | Meyer | Dec. 24, 1957 |
| 2,818,493 | Pilia | Dec. 31, 1957 |
| 2,856,512 | Seeloff | Oct. 14, 1958 |